(12) United States Patent
Allan

(10) Patent No.: US 11,375,405 B2
(45) Date of Patent: Jun. 28, 2022

(54) IDENTIFIER-LOCATOR NETWORK PROTOCOL (ILNP) COORDINATED MULTIPOINT (COMP) AND MULTIPLE CONNECTIVITY

(71) Applicant: Telefonaktiebolaget LM Ericsson (publ), Stockholm (SE)

(72) Inventor: David Ian Allan, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 84 days.

(21) Appl. No.: 16/967,974

(22) PCT Filed: Feb. 28, 2018

(86) PCT No.: PCT/IB2018/051296
§ 371 (c)(1),
(2) Date: Aug. 6, 2020

(87) PCT Pub. No.: WO2019/166857
PCT Pub. Date: Sep. 6, 2019

(65) Prior Publication Data
US 2021/0037421 A1   Feb. 4, 2021

(51) Int. Cl.
*H04W 28/08* (2009.01)
*H04W 76/12* (2018.01)
(Continued)

(52) U.S. Cl.
CPC ........ *H04W 28/0958* (2020.05); *H04W 76/11* (2018.02); *H04W 76/12* (2018.02); *H04W 76/15* (2018.02); *H04W 80/08* (2013.01)

(58) Field of Classification Search
CPC . H04W 28/0958; H04W 76/12; H04W 76/15; H04W 76/11; H04W 80/08; H04L 61/2503; H04L 61/6068
See application file for complete search history.

(56) References Cited

U.S. PATENT DOCUMENTS

| 2016/0095019 A1 | 3/2016 | Cui et al. |
| 2017/0048914 A1 | 2/2017 | Zeng et al. |
| 2017/0264606 A1* | 9/2017 | Forssell ............. H04L 63/0892 |

FOREIGN PATENT DOCUMENTS

| EP | 2723026 A1 | 4/2014 |
| WO | 2018/207006 A1 | 11/2018 |

OTHER PUBLICATIONS

Orange, "Solutions for Network Resource Consolidation with NFV for Energy Efficiency", 3GPP TSG SA Meeting #74, SP-160947, Dec. 7-9, 2016, pp. 1-6.

* cited by examiner

*Primary Examiner* — Jianye Wu
(74) *Attorney, Agent, or Firm* — Christopher & Weisberg, P.A.

(57) ABSTRACT

A method is for redirecting data traffic destined for user equipment in a cellular network with packet data convergence protocol function local to connection points of the cellular network. The method includes obtaining a prefix and identifier for the user equipment, configuring a secondary connection point to provide a prefix of a primary connection point, the identifier for the user equipment and radio bearer information for the user equipment, and redirecting data traffic for the user equipment to the secondary connection point using network address translation to utilize a prefix of the secondary connection point and the identifier of the user equipment as the destination address for the data traffic.

12 Claims, 8 Drawing Sheets

(51) Int. Cl.
*H04W 76/15* (2018.01)
*H04W 76/11* (2018.01)
*H04W 80/08* (2009.01)

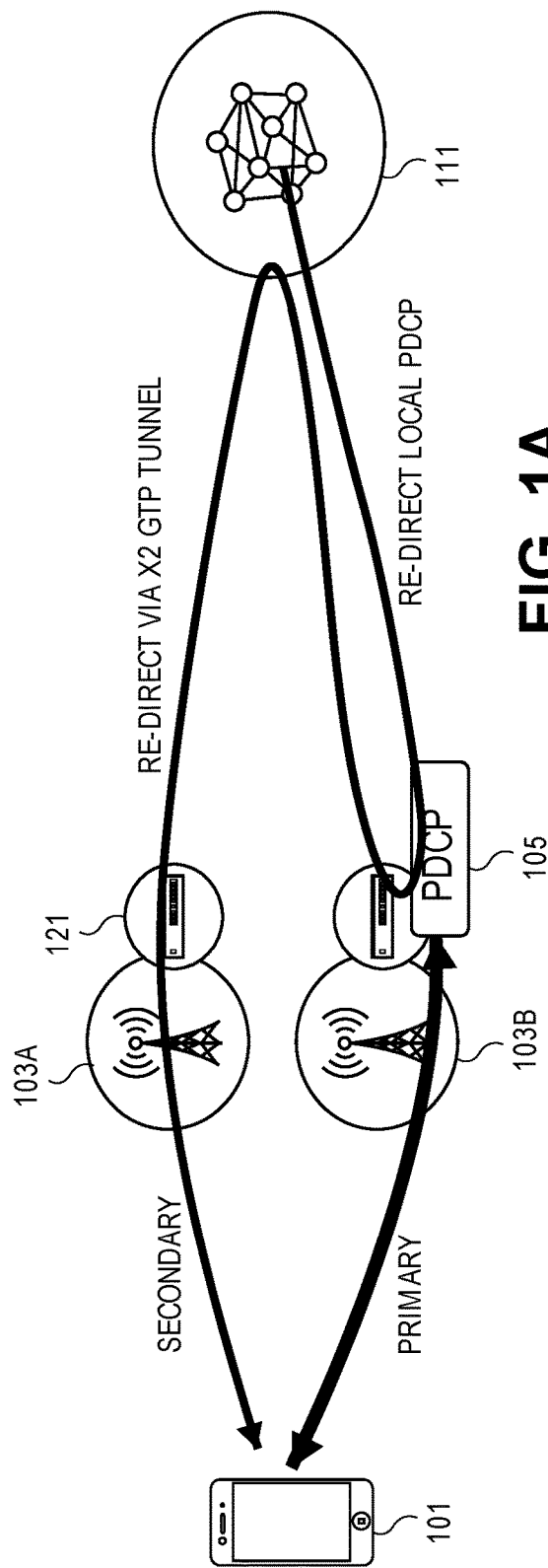
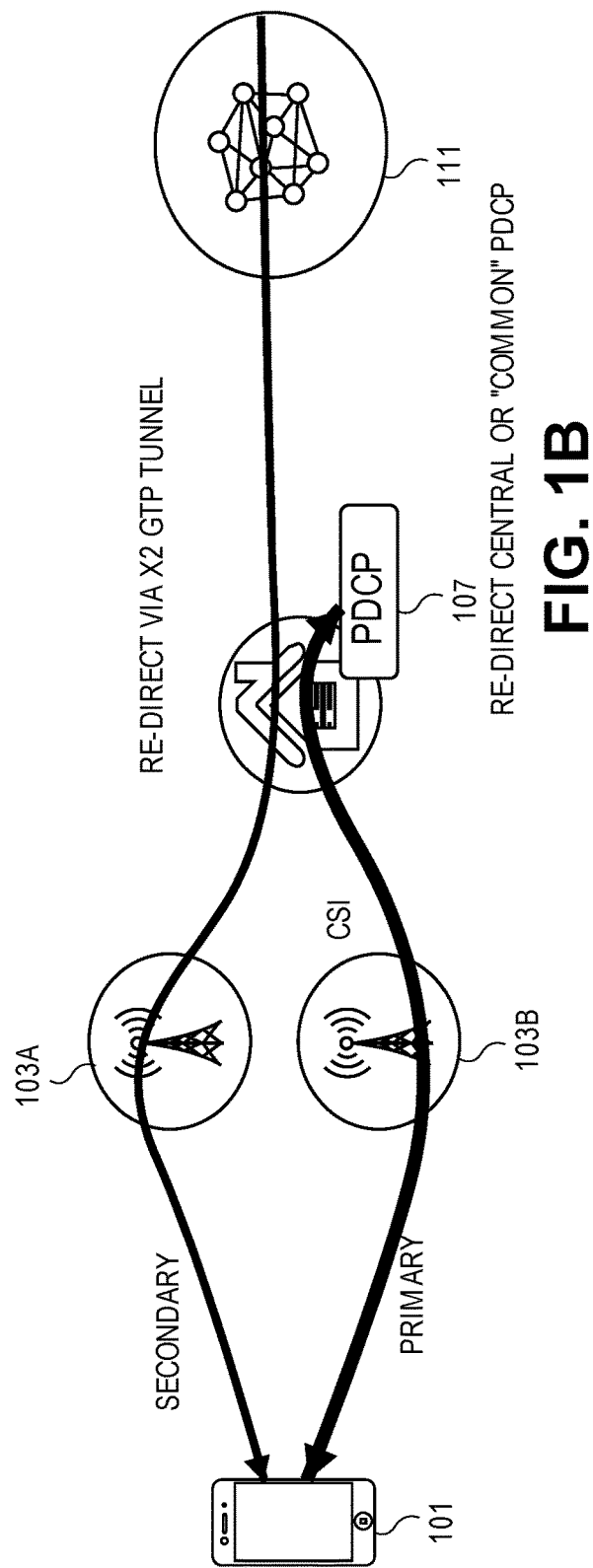
FIG. 1A
FIG. 1B

IDENTIFIER-LOCATOR NETWORK PROTOCOL (ILNP) COORDINATED MULTIPOINT (COMP) AND MULTIPLE CONNECTIVITY

CROSS-REFERENCE TO RELATED APPLICATIONS

This application is a national stage of International Application No. PCT/IB2018/051296, filed 2018 Feb. 28, which is hereby incorporated by reference.

TECHNICAL FIELD

Embodiments of the invention relate to the field of coordinated multipoint (CoMP) in cellular communication networks; and more specifically, to the utilization of identifier-locator network protocol (ILNP) to redirect data traffic to mobile user equipment in the cellular communication network.

BACKGROUND

Cellular communication networks enable a user equipment (UE), such as cellular phones and similar computing devices, to communicate using spread spectrum radio frequency communication. The UE communicates directly with a radio access network (RAN). The RAN includes a set of base stations such as evolved universal terrestrial radio access network (E-UTRAN) nodes, referred to as E-UTRAN node B or eNodeB. The RAN interfaces with a core network that connects the UE to a packet data network (PDN) via which the UE can communicate with other devices, referred to as corresponding nodes (CNs), in the cellular communication network and with devices external to the cellular communication network. The UE connection to a cellular network is typically tied to an anchor point via the general packet radio service (GPRS) tunneling protocol (GTP). GTP allows UEs of the cellular communication network to move from place to place while continuing to connect to the Internet as if from one location.

Packet Data Convergence Protocol (PDCP) provides a set of services to manage radio resources in a radio access network, e.g., spectrum scheduling. PDCP supports the transfer of user plane data, the transfer of control plane data, header compression, ciphering, and integrity protection.

Cellular networks rely on overlay mechanisms that require more complex addressing schemes as each path across the network is uniquely identified at layer 3. Currently, a coordinating entity is identified by a care of address (CoA) in an anchor point based architecture. The coordinating entity serves to distribute downstream traffic across a set of possible baseband processing units distributed in the RAN. In some cases, this may be a PDCP end point. This distribution between the coordinating entity and the baseband units can be performed via the X2 interface (typically utilizing GTP), and may involve decapsulation and re-encapsulation of data traffic. The process also introduces additional overhead and latency in traffic distribution.

Future wireless communication networks are expected to increase both coverage and capacity by using cell cooperation for signal transmission and reception between nodes in the network and UEs located in the cooperating cells. This can manifest itself in two forms: based upon channel state information, the selection of which baseband unit has the highest capacity path to reach a UE using a given block of spectrum, when scheduling transmission, which is generally referred to as coordinated multipoint (CoMP), and the simultaneous transmission to a UE from multiple baseband units using heterogeneous spectrum blocks, which is referred to as multiple connectivity (MC).

SUMMARY

In one embodiment, a method is implemented by a network device, where the method is for redirecting data traffic destined for user equipment in a cellular network with packet data convergence protocol (PDCP) function local to connection points of the cellular network. The method includes obtaining a prefix and identifier for the user equipment, configuring a secondary connection point to provide a prefix of a primary connection point, the identifier for the user equipment and radio bearer information for the user equipment, and redirecting data traffic for the user equipment to the secondary connection point using network address translation to utilize a prefix of the secondary connection point and the identifier of the user equipment as the destination address for the data traffic.

In another embodiment, the network device that implements the method for redirecting data traffic destined for user equipment in the cellular network with PDCP function local to connection points of the cellular network includes a non-transitory computer readable medium having stored therein the PDCP function, and a processor. The processor is coupled to the non-transitory computer readable medium. The processor is to execute the PDCP function. The PDCP function is to obtain a prefix and identifier for the user equipment, to configure a secondary connection point to provide a prefix of a primary connection point, the identifier for the user equipment and radio bearer information for the user equipment, and to redirect data traffic for the user equipment to the secondary connection point using network address translation to utilize a prefix of the secondary connection point and the identifier of the user equipment as the destination address for the data traffic.

In a further embodiment, a computing device is configured to execute a plurality of virtual machines. The virtual machines are configured to support network function virtualization (NFV). The plurality of virtual machines support the method for redirecting data traffic destined for user equipment in the cellular network with PDCP function local to connection points of the cellular network. The computing device includes a non-transitory computer readable medium having stored therein the PDCP function, and a processor coupled to the non-transitory computer readable medium. The processor is configured to execute a virtual machine from the plurality of virtual machines. The virtual machine is to execute the PDCP function. The PDCP function is to obtain a prefix and identifier for the user equipment, to configure a secondary connection point to provide a prefix of a primary connection point, the identifier for the user equipment and radio bearer information for the user equipment, and to redirect data traffic for the user equipment to the secondary connection point using network address translation to utilize a prefix of the secondary connection point and the identifier of the user equipment as the destination address for the data traffic.

In one embodiment, a control plane device in a network including a plurality of data plane devices is in communication with the plurality of data plane devices and configured to implement the method for redirecting data traffic destined for user equipment in the cellular network with PDCP function local to connection points of the cellular network. The control plane device includes a non-transitory computer readable medium having stored therein the PDCP function, and a processor coupled to the non-transitory computer readable medium, the processor to execute the PDCP function, the PDCP function to obtain a prefix and identifier for the user equipment, to configure a secondary connection point to provide a prefix of a primary connection point, the identifier for the user equipment and radio bearer information for the user equipment, and to redirect data traffic for the user equipment to the secondary connection point using network address translation to utilize a prefix of the secondary connection point and the identifier of the user equipment as the destination address for the data traffic.

BRIEF DESCRIPTION OF THE DRAWINGS

The invention may best be understood by referring to the following description and accompanying drawings that are used to illustrate embodiments of the invention. In the drawings:

FIGS. 1A and 1B are diagrams of contrasting architectures for the use of CoMP/MC.

DETAILED DESCRIPTION

Figure 2:
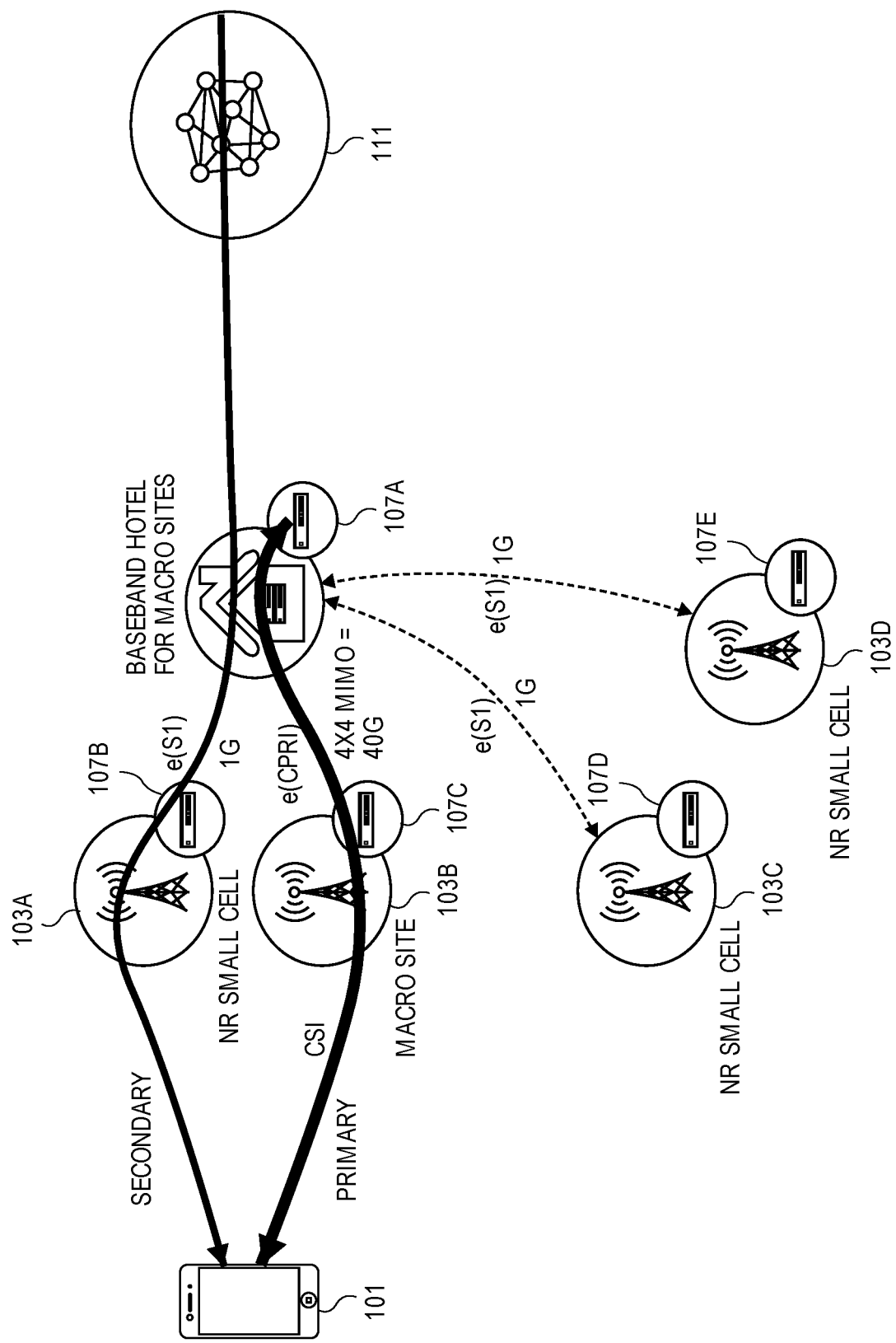
FIG. 2 is a diagram of an example hybrid network architecture with a distribution of small cells and macro sites.

The following description describes methods and apparatus for reducing complexity, overhead and latency in redirecting data traffic to a user equipment (UE) in a network implementing coordinating multipoint (CoMP) and multi-connectivity (MC) by using identifier locator network protocol (ILNP). In some embodiments, the employment of ILNP permits the elimination of anchor points. Instead, the locator is associated with a packet data convergence protocol (PDCP) endpoint that registered with a domain name system (DNS) and is advertised to correspondents. The embodiments use ILNP prefix translation as a vehicle for the PDCP endpoint to direct traffic to the desired UE via its current connection point or baseband. Each connection point or baseband would have an ILNP locator associated with it, and based upon channel state information (CSI) reported to the PDCP the PDCP endpoint would distribute data traffic accordingly. This mechanism would be feasible even in complicated or virtualized topologies, e.g., if an a priori mesh of tunnels existed to support virtualization.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/ or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

ILNP is a network protocol that changes the semantics of an Internet Protocol (IP) address to have two distinct namespaces. The first namespace is referred to as an identifier and the second namespace is referred to as a locator. The identifier is a non-topological name for uniquely identifying a node. The locator is a topologically bound name for an Internet Protocol (IP) subnetwork. By separating identifier and locator, a device can change locations within a network without the identity of the device changing and therefore associated session state (e.g. transmission control protocol (TCP) or IP security (IPSEC)) remains valid independent of the device's point of attachment to the network. The change in semantics of the IP address is transparent to the network layer so routers in the network would forward IP packets and ILNP packets in the same manner.

Overview

The embodiments provide a mechanism for redirecting data traffic to a UE in a network implementing CoMP and/or MC by using ILNP. The embodiments use ILNP prefix translation as a vehicle for a PDCP endpoint to direct traffic to the desired UE via its current connection point or baseband. Each connection point or baseband has an ILNP locator associated with it, and based upon CSI reported to the PDCP the PDCP endpoint distributes data traffic accordingly. This mechanism would be feasible even in complicated topologies, e.g., if an a priori mesh of tunnels existed to support virtualization. Given the frequency of CSI reports, if existing ILNP mechanisms were used to continually update the state of the local radio topology to correspondents it would cause significant load on the network, which the embodiments overcome.

Thus, the embodiments leverage a key advantage in the use of ILNP, which is an architectural separation of mobility from virtualization and the elimination of anchor points. The embodiments have the advantage of utilizing ILNP to support downstream traffic direction in rich radio topologies while hiding the richness and high frequency of topology update reporting from correspondent nodes.

Further, the embodiments address a subtlety to eliminating general packet radio service (GPRS) tunneling protocol (GTP) tunneling to anchor points, which is that for emerging radio topologies, a single point of attachment for a UE to the network is unlikely. A UE is likely to have multiple connection points for a given network. A UE may be associated with and be able to communicate with the network via multiple spectrum blocks served by multiple antenna sites with the coordinating entity selecting the best combination of connectivity from the set of possibilities based upon channel state information (CSI) reported by the UE. This may be in the form of coordinated multipoint whereby for a given carrier frequency range, more than one antenna/sector can be selected to communicate with the UE, and this needs to be coordinated to avoid collisions. In other cases, this may be in the form of multi-connectivity where non-conflicting spectrum blocks served by multiple antennas can be used to simultaneously send traffic to the UE.

The baseband processing for these antennas may be co-located, in which case there is no obvious L3 networking topology for the radio end. However, the baseband processing may also be distributed in the radio access network (RAN) such that a coordinating entity will direct traffic over an L3 network to individual antennas. Today this is done with GTP, however, the embodiment provides support for the elimination of anchor points and possibly GTP with an alternative solution for traffic steering and mobility.

Where CoMP is implemented by a cellular network the UE is provided the ability to have connectivity with more than one antenna or eNodeB, and data traffic sent to and from the antenna or eNodeB is sent using the best air path or connectivity at any given instant of time for a given chunk of spectrum. The UE can continuously monitor the quality of connectivity with each available connection point for a cellular network. As used herein, a connection point encompasses any type of antenna, base station, eNodeB or similar aspect or a RAN or access network whereby the UE is able to communicate as an initial point of contact with the cellular network. A "best path" is determined on the basis of measurements reported by the UE to the PDCP endpoint or function, the measurements are known as channel state information (CSI). The PDCP endpoint can be implemented in various locations within the RAN or cellular network as discussed further herein below. The UE has a control adjacency with the PDCP endpoint over a primary path and reports CSI for all current radio paths. The PDCP endpoint uses the CSI to decide which antenna at any given instant is the best path to the UE and to arbitrate the best use of radio resources when serving a community of UEs.

Where multi-connectivity (MC) is implemented in a cellular network, this technology is a variation of CoMP that operates similarly, but in which there are non-conflicting spectrum blocks that can simultaneously be used for communication with a UE. The control structure for MC is similar to CoMP with the UE reporting CSI to a PDCP endpoint. MC is expected to be a significant technology for future cellular networks (e.g., those implementing 5G technologies) as it is how new radio (NR) small cells will offload macro cells. 5G based networks are expected to utilize densely clustered sets of small cells (e.g., NR small cells) each covering smaller areas with a given range of the spectrum utilized as well as macro cells or macro-sites that cover larger areas and a different range of the spectrum, where macro cells are likely to actively offload UEs to small cells where feasible to manage the load on the cellular network. For example, the PDCP endpoint at a macro cell will select the MC offload mechanism to a small cell whenever possible.

Dependent on the design of the cellular network, the PDCP functionality can be implemented at a central location away from the edge of the cellular network or distributed to base stations at the edge (i.e., local to the UE). When the PDCP functionality and baseband processing are centrally located, then CoMP/MC decisions may be implemented as a local (i.e., base station or cell related) matter. The CoMP and MC redirection of data traffic for UEs to other base stations is accomplished using GTP tunnels over the X2 interface. However, for non-centrally located PDCP functions, this creates unnecessary overhead and inefficiencies.

FIGS. 1A and 1B are diagrams of contrasting architectures for the use of CoMP/MC. In the first example architecture (A), a UE 101 is connected with the cellular network via a primary connection point 103B and a secondary connection point 103A. The connection points 103A, B can be cellular radio antenna and base station, eNodeB, or similar connection point. In the example architecture (A), the analog spread-spectrum cellular communication between the UE 101 and connection points 103A, B are then processed by respective local PDCP endpoints 105, which enable communication with corresponding nodes via a packet network 111. In the example, the PDCP endpoint 105 is located with connection point 103B, for example at a base station executed with network hardware that supports other functions. The connection point 103A could also be a host for the PDCP endpoint via local network hardware 121.

The UE 101 provides CSI to the primary connection point 103B and PDCP endpoint 105 periodically that enables the PDCP 105 to determine when data traffic and communication with the UE 101 should change from the primary connection point 103B to the secondary connection point 103A. When the CSI indicates that the secondary connection point 103A provides the better path for the UE 101, the PDCP endpoint 105B at the primary connection point redirects incoming data traffic for the UE 101 from corresponding nodes by establishing a GTP tunnel to the secondary connection point 103A. The requires the encapsulation of the incoming data packets with GTP by the PDCP endpoint 105 and the forwarding of these data packets to the connection point 103A where they are de-encapsulated. The GTP tunnel to the secondary connection point 103A is established using the X2 interface of the cellular network. This use of the GTP tunnel increases the overhead and compute resources required to redirect the downstream data for the UE 101.

In contrast, in the central or common PDCP example architecture (B), there is not a need to perform a redirection of downstream traffic for the UE 101. In this architecture, the PDCP functions 107 are housed remotely from the primary connection point 103B and secondary connection point 103A. The UE 101 reports CSI to the PDCP endpoint 107, which enables the PDCP endpoint 107 to forward data traffic to the appropriate connection point. The communication between the PDCP endpoint 107 and the connection points utilizes a more bandwidth intensive technology such as the common public radio interface (CPRI) or eCPRI to communicate with the communication points.

FIG. 2 is a diagram of an example hybrid network architecture with a distribution of small cells and macro sites. The embodiments may be applied to an architecture such as the hybrid network architecture where the PDCP functions are not centralized or common. The example shows both PDCP functions being distributed (local) 107B-E and centralized 107A for sake of illustration. In this example architecture, the connection points include small cells (e.g., NR small cells 103A, 103C, 103D) and macro sites/cells 103B. As discussed above, small cells typically communicate in different areas of the spectrum than the macro cells and have a smaller range than the macro cells. While the PDCP endpoint 107 can be at any given location, in many embodiments, it will be located at one of a set of local connection points 103A-D, such as at the macro cell, i.e. PDCP endpoint 107E.

The UE 101 is likely to connect with a macro cell 103B as a primary connection point. The UE 101 is then likely to connect with at least one small cell 103A as a secondary connection point. In some embodiments, the PDCP endpoints are local to the small cells and/or the macro cells (e.g., NR small cells 103A, 103C and 103D have PDCP endpoints 107B, 107D and 107E, respectively). A macro cell 103B can include a local PDCP endpoint 107C. In other embodiments, a common or centralized PDCP endpoint 107A is present for the macro cell, which may be housed remotely from the cell such as in a 'baseband hotel' where other services and functions are hosted for a macro cell that is remote or cloud based. Thus, the UE 101 can communicate with the packet network 111 and corresponding nodes via small cells or macro cells.

The macro cells 103B may communicate with a centralized PDCP endpoint 107 via CPRI/eCPRI that carries a 4×4 multiple in multiple out (MIMO) signal at 40 Gigabits over Ethernet or similar connection. The small cells may communicate via the S1 interface or eS1 interface via 1 Gigabit Ethernet connections. In alternate configurations, where the PDCP endpoints are local 107B-E, the small cells and macro cells may be connected via a packet network 111 or similar wide area network. In this case, where redirection of downstream data is needed for a UE 101, then the X2 interface is used to establish a GTP tunnel for this redirected traffic. For example, a macro cell 103B serving as a primary connection point can redirect data for the UE 101 when it transfers to a small cell 103A, which is a secondary connection point. The PDCP endpoint 107C can establish a GTP tunnel to the PDCP endpoint 107B and forward data traffic using encapsulation via the GTP tunnel.

Figure 3:
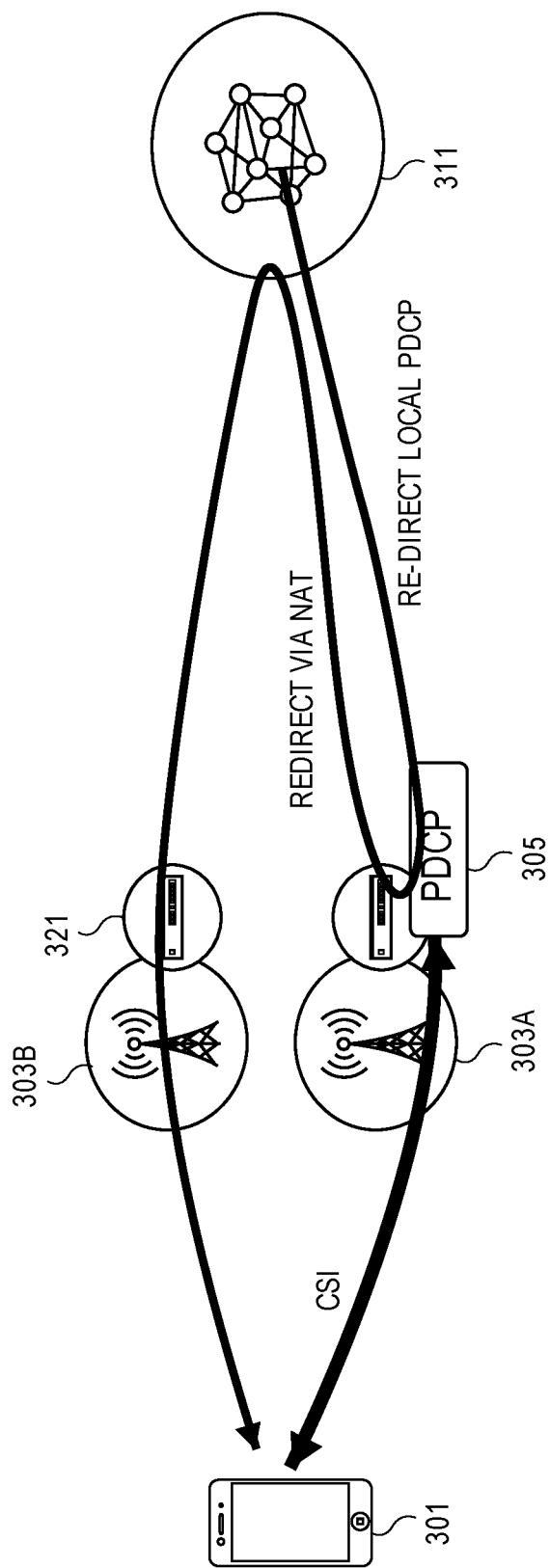
FIG. 3 is a diagram illustrating an embodiment of re-direction using ILNP for a simplified CoMP/MC architecture.

FIG. 3 is a diagram illustrating an embodiment of redirection using ILNP for a simplified CoMP/MC architecture. The example of FIG. 3 is simplified from a more complex architecture for sake of illustration and clarity. One skilled in the art would understand that the principles and structures of the embodiments are also applicable to other architectures where the PDCP functions are distributed to the cells including hybrid networks that include small and macro cells. The embodiments provide a simplified mechanism for forwarding data to a UE when it changes connection points, such as from a primary connection point to a secondary connection point. The embodiments utilize ILNP or similar addressing schemes to redirect data traffic. Using ILNP or similar addressing protocols enables CoMP/MC connected UE data traffic to be redirected with L3 based prefix translation rather than requiring tunneling and the overhead required for the tunneling. The embodiments also adapt the anchorless aspects of ILNP operation to work with CoMP/MC via topology hiding the access mechanism such that intelligent scheduling of spectrum usage across a possible constellation of baseband units is possible.

In the embodiments, each connection point (e.g., a base station) 303A, B would be associated with a valid prefix in the data network. This prefix would not be advertised to the UE except for the prefix associated with the primary connection point 303A. Therefore, the UE 301 will only register the primary connection point as its location with both a domain name system (DNS) and correspondents. In this way limited visibility prevents issues that are both unintended and malicious including redirection of traffic by Internet Control Message Protocol (ICMP), which may generate a large number of re-directs due to the short range of small cells if the UEs were frequently association and disassociating with small cell and their prefixes. The embodiments are designed to keep PDCP in control of downstream data traffic redirection and to simplify the overall mobility architecture by hiding the complexity of modern rich radio topologies.

In the embodiments, the information that would be coordinated between connection points 303A, B would include a primary connection point prefix, i.e., the prefix associated with the local PDCP endpoint for the primary connection point 303A of a UE 301. The information would also include a mapping of a UE identifier with radio bearers, which are the radio channels utilized to communicate with the UE. The UE utilizes a Protocol Data Unit (PDU) session to communicate with the packet data network. The UE may have an identifier on a per PDU session basis.

In these embodiments, the prefixes associated with the connection points 303A, B may be the upper 64 bits of an address, such as an IPv6 address. The UE identifier may be a lower 64 bits of an address, such as the IPv6 address. This scheme is consistent with ILNP. One skilled in the art would understand that similar addressing schemes can be utilized to provide prefixes to connection points and identifiers to the UEs.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4:
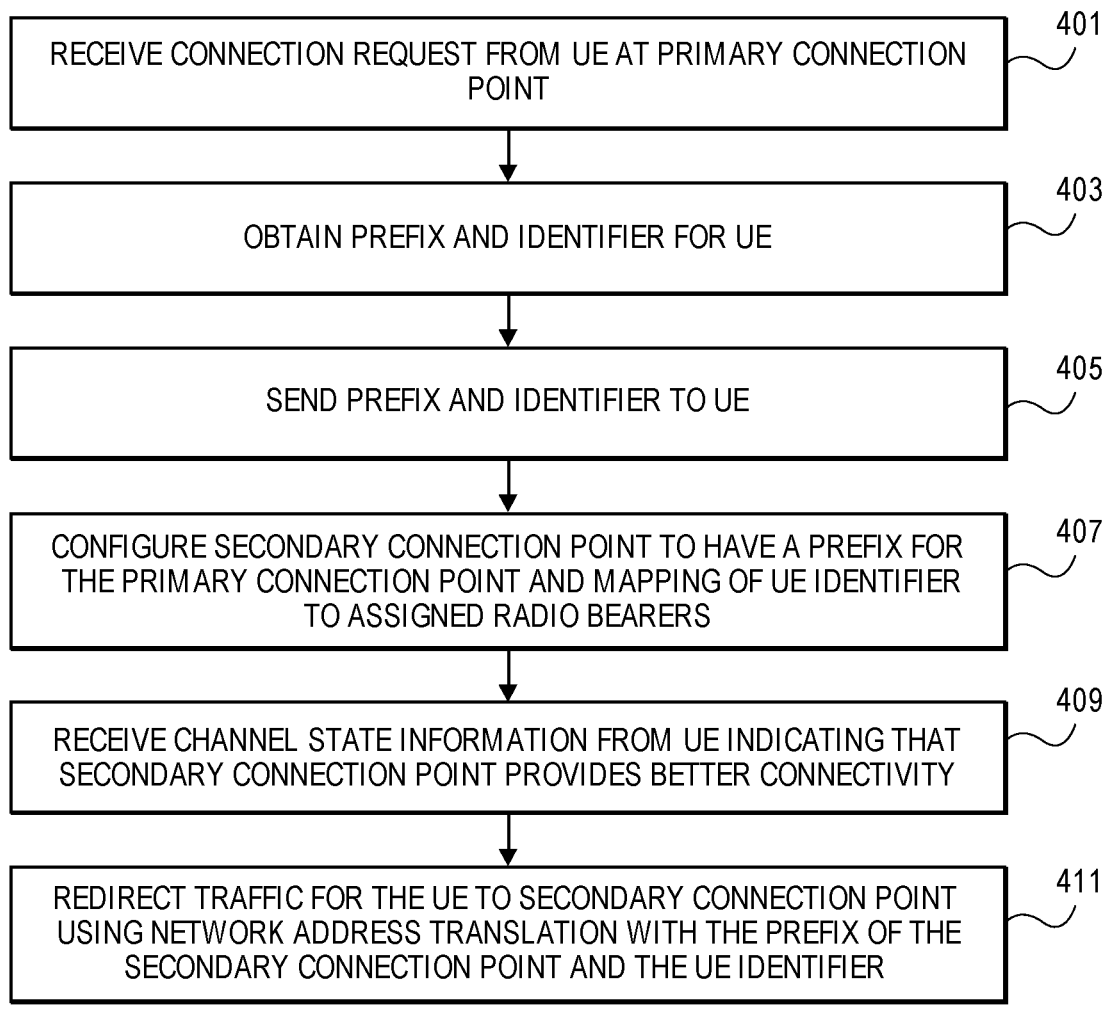
FIG. 4 is a flowchart of one embodiment of a process for re-direction of traffic to a UE by the PDCP endpoint of the primary connection point.

FIG. 4 is a flowchart of one embodiment of a process for re-direction of traffic to a UE by the PDCP endpoint of the primary connection point. The embodiments of the process are described in relation to the example architecture of FIG. 3 for sake of clarity and conciseness. The process may be initiated at the primary connection point when the primary connection point receives a connection request from the UE 301 or similarly associates the UE 301 with the primary connection point (Block 401). In the example of FIG. 3, the UE 301 associates with a primary connection point 303A. The UE 301 and primary connection point 303A can communicate via CoMP/MC or similar communication technologies. A PDU session may be established for the UE 301. This association is orchestrated and the PDU session established by the PDCP endpoint local to the primary contact point, i.e., the PDCP endpoint 305.

In response to the association of the UE 301 and the primary connection point 303A, the PDCP endpoint 305 facilitates the assignment of an address including a prefix for the primary connection point 303A and a UE identifier (Block 403). The PDCP endpoint 305 may obtain or assist the UE 301 in obtaining the prefix and UE identifier via stateless address autoconfiguration (SLAAC) or similar address assignment protocols or technologies. In other embodiments, a UE 301 may self-assign an address including a UE identifier or may be pre-configured with such an address in which case prefix but not a UE identifier may be obtained via SLAAC or similar address assignment protocol Upon obtaining the prefix and UE identifier for the UE 301, the PDCP endpoint 305 sends the prefix and UE identifier to the UE 301 (Block 405).

Based upon CSI information received from the UE 301, the PDCP endpoint 305 will have knowledge of the set of secondary connection points that are candidates use in communication with the UE. The PDCP endpoint 305 communicates with a secondary connection point 303B to provide configuration information (Block 407). The configuration information can include PDU session information, a prefix for the primary connection point, the UE identifier, radio bearer information and similar information. This enables the secondary connection point 303B to implement the re-direction of the data traffic of the UE 301 when it switches to the secondary connection point 303B or where the secondary connection point provides a better path than the primary connection point. The secondary connection point 303B will perform prefix translation on the destination address on traffic sent to the UE 301 in order to only present the locator of the primary connection point 303A to the UE 301. Traffic from the UE 301 will present the correct locator of the primary connection point 303A to the rest of the network. The UE 301 periodically provides CSI to the primary connection point 303A and PDCP endpoint 305 (Block 409). The CSI enables the primary connection point 303A and PDCP endpoint 305 to determine that the secondary connection point 303B provide a better path or connectivity, which enables the PDCP endpoint 305 to redirect downstream traffic to the secondary connection point 303B to enable better delivery of that data traffic. As shown, the PDCP endpoint 305 can be implemented by a network element or similar device at a base station or similar connection point 303A. The secondary connection point 303B could also support a PDCP endpoint at a network element 321 or similar hardware, but in the example PDCP functionality is implemented at the primary connection point 303A.

Upon identifying a case where the CSI indicates a better connectivity with the secondary connection point 303B (Block 409), the PDCP 305 initiates the redirection using network address translation (NAT) (Block 411). Where ILNP is utilized, the destination address of the data packets can be re-written by replacing the prefix in the destination address. The incoming data packets have destination addresses with the prefix associated with primary connection point 303A or PDCP endpoint 305. The prefix is replaced with the prefix for the secondary connection point 303B and forwarded toward the secondary connection point 303B via the packet network 311. The lower portion of the destination address, the UE identifier remains unchanged during the re-write and redirection.

Figure 5:
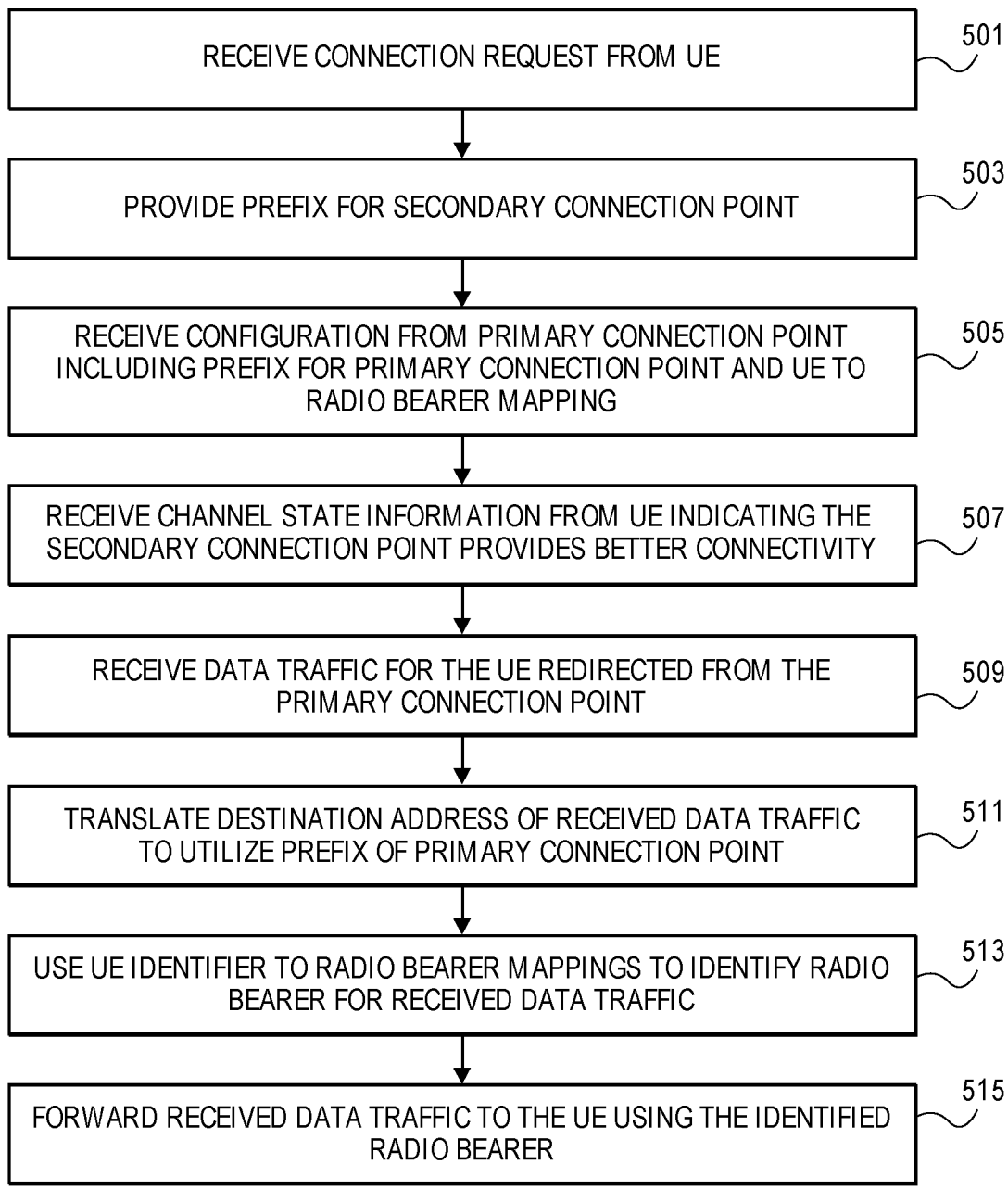
FIG. 5 is a flowchart of one embodiment of a process for re-direction of traffic to a UE by the PDCP endpoint of the secondary connection point.

FIG. 5 is a flowchart of one embodiment of a process for re-direction of traffic to a UE by the PDCP endpoint. The embodiments of the process are described in relation to the example architecture of FIG. 3 for sake of clarity and conciseness. The process is executed in in response to the operation of the primary connection point 303A when the primary connection point 303A redirects traffic of the UE 301 to the secondary connection point 303B. The secondary connection point 303B and PDCP endpoint 305 can receive a connection request from the UE 301 or similarly associate with the UE 301 (Block 501). In the example of FIG. 3, the UE 301 associates with a primary connection point 303A as well as the secondary connection point 303B. The UE 301 and secondary connection point 303A can communicate via CoMP/MC or similar communication technologies. The secondary connection point 303B can provide a prefix for the secondary connection point to the UE 301 (Block 503).

The secondary connection point 303B receives configuration information from the primary connection point 303A and associated PDCP endpoint 305 (Block 505). The configuration information can include PDU session information, a prefix for the primary connection point, the UE identifier, radio bearer information and similar information. This enables the secondary connection point 303B to implement the re-direction of the data traffic of the UE 301 when the secondary connection point 303B provides a better path than the primary connection point 303A. The functions supporting the redirection of traffic to the secondary connection point 303B can be referred to as the redirection function, which may be executed by a network element at the base station or similar network element 321 of the secondary connection point 303B. The CSI enables the primary connection point 303A and PDCP endpoint 305 to determine that the secondary connection point 303B provides a better path or connectivity, which enables the PDCP endpoint 305 to redirect downstream traffic to the secondary connection point 303B to enable better delivery of that data traffic.

Upon identifying a case where the CSI indicates a better connectivity with the secondary connection point 303B, redirection functions of the secondary connection point 303B begin receiving the redirection of data traffic for the UE 301 with the redirection function using NAT or similar services to modify the addressing of the received data traffic (Block 509). Where ILNP is utilized, the destination address of the data packets has been re-written at the PDCP 305 by replacing the prefix in the destination address. The incoming redirected data packets have destination addresses with the prefix associated with secondary connection point 303B. This prefix is replaced with the prefix for the primary connection point 303A or PDCP endpoint 305 (Block 511).

The UE 301 to radio bearer mappings are then utilized to determine a radio bearer for sending data to the UE 301 (Block 513). The secondary connection point 303B then forwards the received data using CoMP/MC and determined radio bearer (Block 515).

Thus, the described methods and systems of the embodiments provide advantages over the prior art. The embodiments recognize that GTP tunneling for the X2 can be replaced with a local prefix translation step. The embodiments offer a significantly lighter weight instantiation of an L3 topology in the RAN. The advantages include less bandwidth overhead, and reduced latency in packet processing. Reduced latency is significantly impacts the quality of UE connections as radio path quality is ephemeral, i.e. quickly changing. Using address translation, e.g., with an ILNP approach, there would not be metadata to facilitate ordered delivery of packets. Thus, only one L3 connected "path" to the UE could may be used at a given time. If the latency from PDCP to UE was less than packet arrival rate, weighted round robin (WRR) could be used. In some embodiment prefix translation for downstream traffic distribution can be employed as a programmable per packet balancer. Further advantages include reducing information to be coordinated between base stations, reducing the number of GTP tunnels to be maintained, a simplified re-direct process, use of prefix NAT which is less compute intensive than the encapsulation and decapsulation process and GTP tunnel switching. In some embodiments, redirection of data traffic can therefore be distributed to multiple connection points rather providing suitable connectivity rather than to a single connection point for the user equipment.

Upstream

In some embodiments, the processes can include a mode of operation where CoMP/MC is not only employed downstream. Upstream CoMP/MC uses a preferred primary path. However, in some embodiments, the UE can dynamically select the upstream path, for example based on CSI. Being unaware of the prefix or locator associated with each connection point, the UE would use the primary prefix in the source address of data packets sent. The connection points or PDCP endpoints would police that the primary prefix in the source address was correct, i.e., that the prefix of the primary connection point is used in the source address.

Figure 6A:
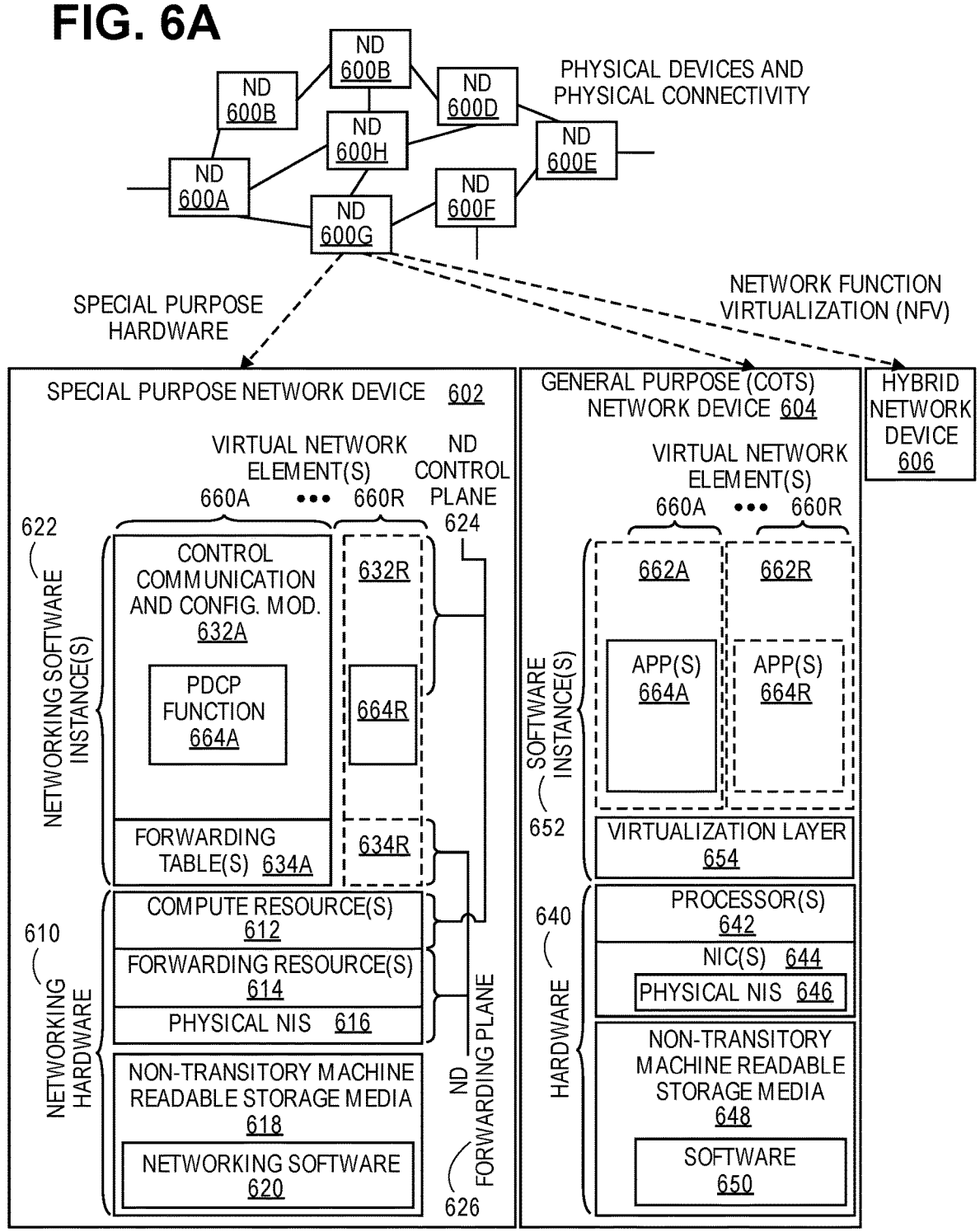
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general-purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine-readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
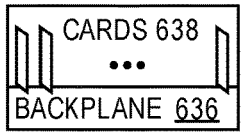
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R. The functions supporting redirection of traffic by a PDCP function 664A-R or similar entity can be implemented as an application or set of applications. The PDCP function 664A-R can implement the redirection process of a primary connection point as described herein above. The redirection function of the secondary connection point could be similarly implemented.

The virtual network element(s) 660A-R perform similar functionality to the virtual network element(s) 630A-R— e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
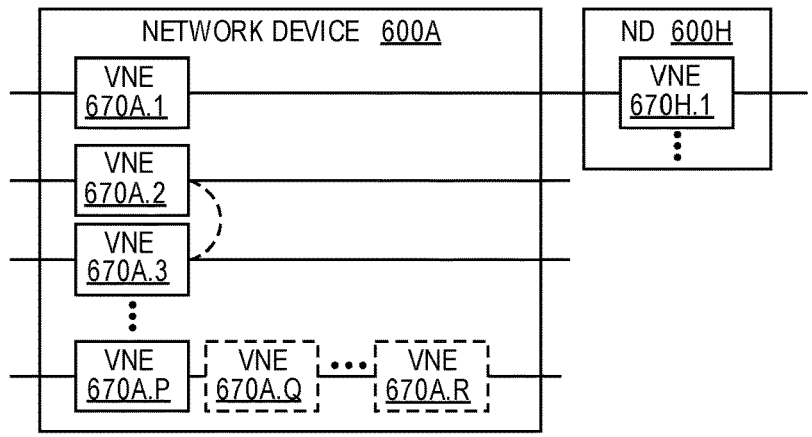
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
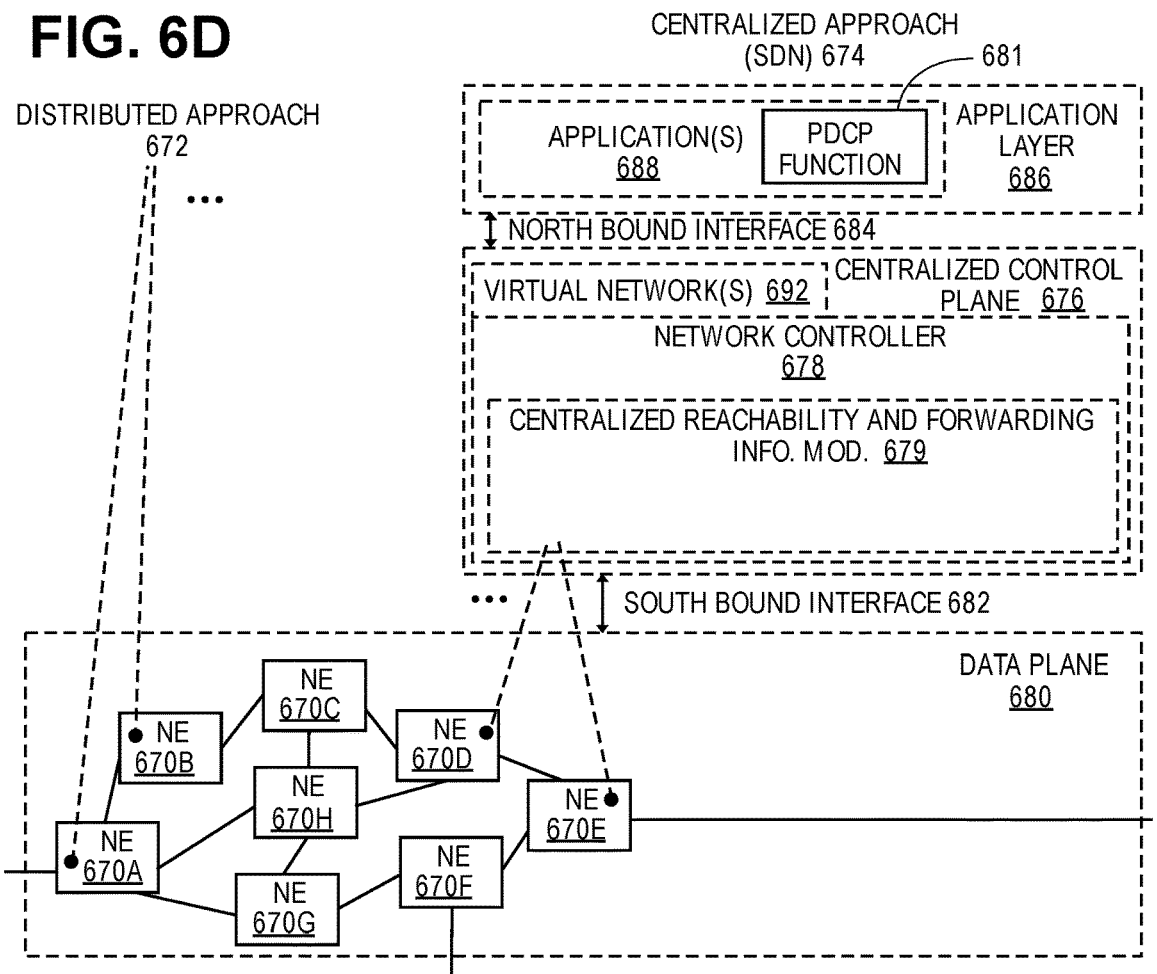
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general-purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The functions supporting redirection of traffic by a PDCP function 681 similar entity can be implemented as an application or set of applications. The PDCP function 681 can implement the redirection process of a primary connection point as described herein above. The redirection function of the secondary connection point can be similarly implemented.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
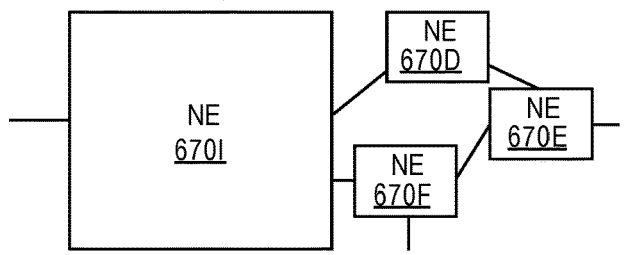
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
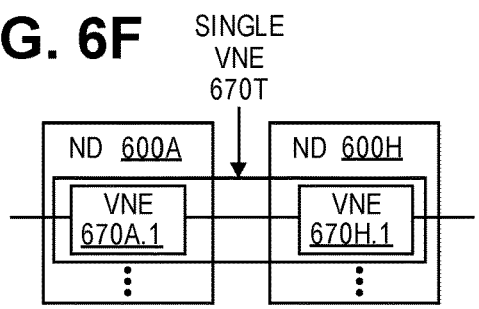
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
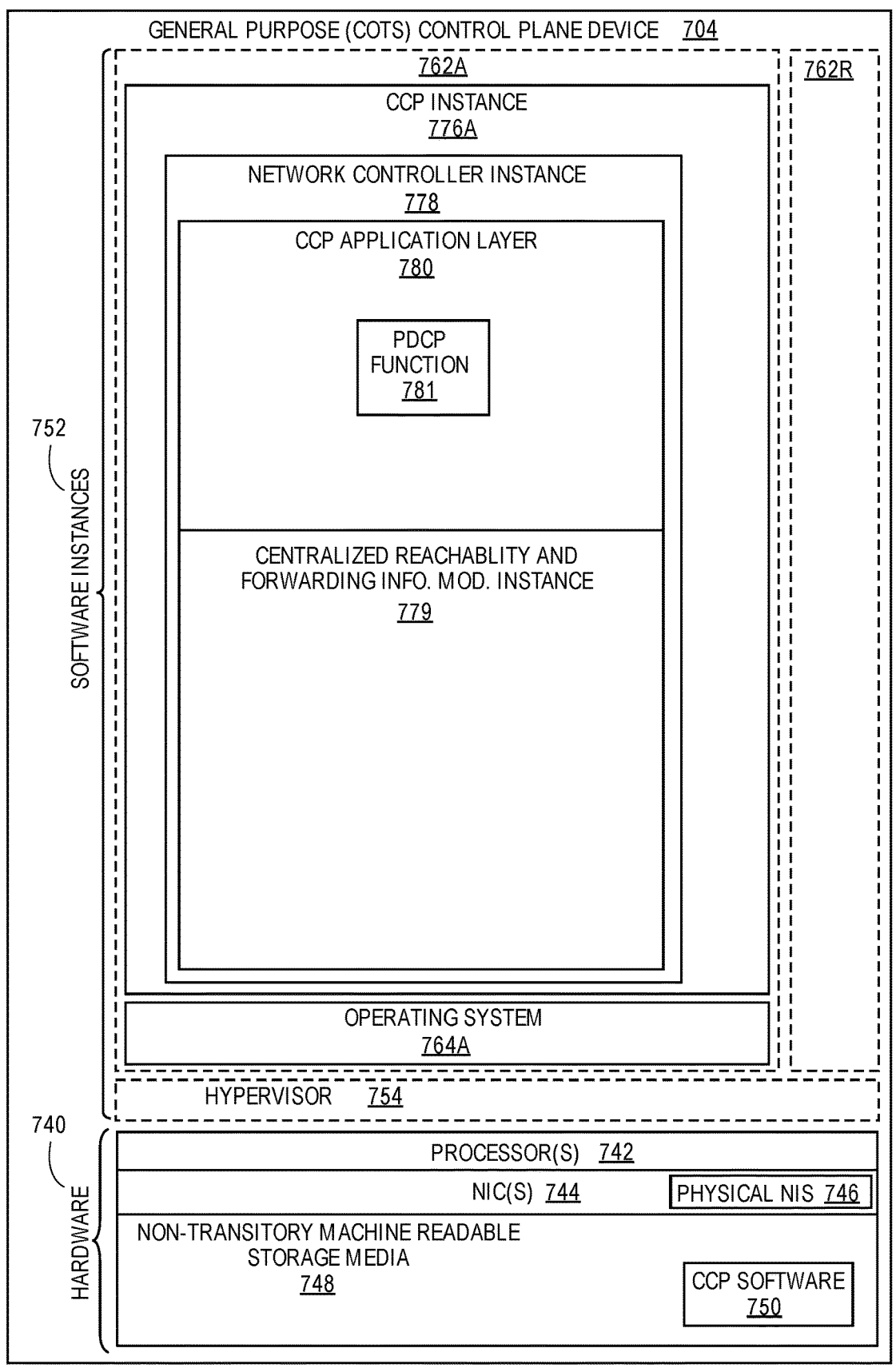
FIG. 7 illustrates a general-purpose control plane device with centralized control plane (CCP) software 750, according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general-purpose control plane device 704 including hardware 740 comprising a set of one or more processor(s) 742 (which are often COTS processors) and physical NIs 746, as well as non-transitory machine-readable storage media 748 having stored therein centralized control plane (CCP) software 750.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 676 works with virtual network view(s) (logical view(s) of the network) and the middleware layer provides the conversion from the virtual networks to the physical view. The functions supporting redirection of traffic by a PDCP function 781 or similar entity can be implemented as an application or set of applications. The PDCP function 781 can implement the redirection process of a primary connection point as described herein above. The redirection function of the secondary connection point can be similarly implemented.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device, the method for redirecting data traffic destined for user equipment in a cellular network with packet data convergence protocol (PDCP) function local to connection points of the cellular network, the method comprising:
   receiving a connection request by a primary connection point from the user equipment;
   obtaining a prefix for the primary connection point and identifier for the user equipment;
   configuring a secondary connection point to provide the prefix of the primary connection point, the identifier for the user equipment and radio bearer information for the user equipment;
   receiving channel state information from the user equipment indicating connectivity quality for the primary connection point, the secondary connection point, and a plurality of additional connection points; and
   redirecting data traffic for the user equipment to the secondary connection point using network address translation to utilize a prefix of the secondary connection point and the identifier of the user equipment as the destination address for the data traffic,
   the redirection of the data traffic being directed to a combination of connection points including the plurality of additional connection points and the redirection is responsive to the channel state information indicating multiple connection points that provide suitable connectivity for the user equipment.

2. The method of claim 1, further comprising:
   sending the prefix of the primary connection point to the user equipment, in response to receiving a connection request of the user equipment.

3. The method of claim 1, wherein the redirecting of the data traffic to the secondary connection point is responsive to the channel state information indicating a better connectivity with the secondary connection point.

4. A network device to implement a method for redirecting data traffic destined for user equipment in a cellular network with packet data convergence protocol (PDCP) function local to connection points of the cellular network, the network device comprising:
   a non-transitory computer readable medium having stored therein the PDCP function; and
   a processor coupled to the non-transitory computer readable medium, the processor to execute the PDCP function, the PDCP function to receive a connection request by a primary connection point from the user equipment, to obtain a prefix for the primary connection point and identifier for the user equipment, to configure a secondary connection point to provide the prefix of the primary connection point, the identifier for the user equipment and radio bearer information for the user equipment, to receive channel state information from the user equipment indicating connectivity quality for the primary connection point, the secondary connection point, and a plurality of additional connection points, and to redirect data traffic for the user equipment to the secondary connection point using network address translation to utilize a prefix of the secondary connection point and the identifier of the user equipment as the destination address for the data traffic,
   the redirection of the data traffic is directed to a combination of connection points including the plurality of additional connection points and the redirection is responsive to the channel state information indicating multiple connection points that provide suitable connectivity for the user equipment.

5. The network device of claim 4, wherein the PDCP function is further to send the prefix of the primary connection point to the user equipment, in response to receiving a connection request of the user equipment.

6. The network device of claim 4, wherein the redirecting of the data traffic to the secondary connection point is responsive to the channel state information indicating a better connectivity with the secondary connection point.

7. A computing device configured to execute a plurality of virtual machines, the virtual machines configured to support network function virtualization (NFV), the plurality of virtual machines to support a method for redirecting data traffic destined for user equipment in a cellular network with packet data convergence protocol (PDCP) function local to connection points of the cellular network, the computing device comprising:
   a non-transitory computer readable medium having stored therein the PDCP function; and
   a processor coupled to the non-transitory computer readable medium, the processor to execute a virtual machine from the plurality of virtual machines, the virtual machine to execute the PDCP function, the PDCP function to receive a connection request by a primary connection point from the user equipment, to obtain a prefix for the primary connection point and identifier for the user equipment, to configure a secondary connection point to provide the prefix of the primary connection point, the identifier for the user equipment and radio bearer information for the user equipment, to receive channel state information from the user equipment indicating connectivity quality for the primary connection point, the secondary connection point, and a plurality of additional connection points, and to redirect data traffic for the user equipment to the secondary connection point using network address translation to utilize a prefix of the secondary connection point and the identifier of the user equipment as the destination address for the data traffic, the redirection of the data traffic is to a combination of connection points including the plurality of additional connection points and the redirection is responsive to the channel state information indicating multiple connection points that provide suitable connectivity for the user equipment.

8. The computing device of claim 7, wherein the PDCP function is further to send the prefix of the primary connection point to the user equipment, in response to receiving a connection request of the user equipment.

9. The computing device of claim 7, wherein the redirecting of the data traffic to the secondary connection point is responsive to the channel state information indicating a better connectivity with the secondary connection point.

10. A control plane device in a network including a plurality of data plane devices, the control plane device in communication with the plurality of data plane devices and configured to implement a method for redirecting data traffic destined for user equipment in a cellular network with packet data convergence protocol (PDCP) function local to connection points of the cellular network, the control plane device comprising:

a non-transitory computer readable medium having stored therein the PDCP function; and a processor coupled to the non-transitory computer readable medium, the processor to execute the PDCP function, the PDCP function to receive a connection request by a primary connection point from the user equipment, to obtain a prefix for the primary connection point and identifier for the user equipment, to configure a secondary connection point to provide the prefix of the primary connection point, the identifier for the user equipment and radio bearer information for the user equipment, to receive channel state information from the user equipment indicating connectivity quality for the primary connection point, the secondary connection point, and a plurality of additional connection points, and to redirect data traffic for the user equipment to the secondary connection point using network address translation to utilize a prefix of the secondary connection point and the identifier of the user equipment as the destination address for the data traffic, the redirection of the data traffic is directed to a combination of connection points including the plurality of additional connection points and the redirection is responsive to the channel state information indicating multiple connection points that provide suitable connectivity for the user equipment.

11. The control plane device of claim 10, wherein the PDCP function is further to send the prefix of the primary connection point to the user equipment, in response to receiving a connection request of the user equipment.

12. The control plane device of claim 10, wherein the redirecting of the data traffic to the secondary connection point is responsive to the channel state information indicating a better connectivity with the secondary connection point.

* * * * *